United States Patent
Frostberg et al.

(10) Patent No.: US 9,561,427 B2
(45) Date of Patent: Feb. 7, 2017

(54) CONTROL ALGORITHMS AND METHODS FOR A GAME BOARD ARRANGEMENT

(71) Applicant: KING.COM LIMITED, St. Julians (MT)

(72) Inventors: Daniel Frostberg, Stockholm (SE); Patrick Kelly, Stockholm (SE)

(73) Assignee: KING.COM LTD., St. Julians (MT)

( * ) Notice: Subject to any disclaimer, the term of this patent is extended or adjusted under 35 U.S.C. 154(b) by 123 days.

(21) Appl. No.: 14/278,658

(22) Filed: May 15, 2014

(65) Prior Publication Data
US 2015/0328537 A1 Nov. 19, 2015

(51) Int. Cl.
A63F 13/00 (2014.01)
A63F 3/00 (2006.01)
A63F 3/02 (2006.01)
A63F 13/422 (2014.01)
A63F 13/80 (2014.01)

(52) U.S. Cl.
CPC ............. *A63F 3/00643* (2013.01); *A63F 3/02* (2013.01); *A63F 13/422* (2014.09); *A63F 13/80* (2014.09); *A63F 2003/00996* (2013.01)

(58) Field of Classification Search
None
See application file for complete search history.

(56) References Cited

U.S. PATENT DOCUMENTS

| | | | | |
|---|---|---|---|---|
| 2005/0261044 A1* | 11/2005 | Persidsky | | A63F 3/04 463/9 |
| 2011/0039614 A1* | 2/2011 | Caputo | | G07F 17/32 463/20 |
| 2012/0013071 A1* | 1/2012 | Kane | | G07F 17/32 273/138.1 |
| 2014/0235306 A1* | 8/2014 | Walls | | A63F 13/10 463/9 |
| 2014/0342791 A1* | 11/2014 | Hugh | | A63F 13/80 463/9 |
| 2015/0265910 A1* | 9/2015 | Campbell | | A63F 3/00097 273/236 |

OTHER PUBLICATIONS

IGN, Bejeweled 3 Review, Oct. 24, 2011, http://www.ign.com/articles/2011/10/24/bejeweled-3-review.*
IGN, Bejeweled 3 Video Review, Dec. 7, 2010, https://www.youtube.com/watch?v=_nb4z-BpQA8.*

* cited by examiner

*Primary Examiner* — Jason Yen
(74) *Attorney, Agent, or Firm* — Saul Ewing LLP

(57) ABSTRACT

A method and device for controlling a user interface displaying a game board, comprising, via at least one processor, displaying a game board arrangement having a plurality of game objects each having one or more characteristics, information on said game board arrangement and the game objects being stored in memory, determining an initial selection of a first game object based on user input and the stored information, determining a subsequent input selection of a second game object based on user input and the stored information determining the validity of the subsequent selection as being valid defined by said first and second game objects based on a first direction of the sequence with respect to the game board arrangement, the length of the sequence and if the first and second game object have at least one same characteristic, updating said game board arrangement information.

21 Claims, 13 Drawing Sheets

CONTROL ALGORITHMS AND METHODS FOR A GAME BOARD ARRANGEMENT

FIELD OF THE INVENTION

Some embodiments may relate to algorithms for controlling a user interface responsive to user engagement with an interface of a computer device. The embodiments may have particular, but not exclusive application in the field of computer implemented applications including for example games, in an online or offline environment, and computing devices therefor.

BACKGROUND OF THE INVENTION

There are many technical challenges and technical considerations facing the designer of computer games executed on user or computer devices having a user interface, such as designing algorithms to enable a controllable user interface in the context of available computer devices and resources, which may be limited.

The translation of user interaction with an application, through the user interface, to meaningful application interaction provides a significant challenge in that algorithms must be designed to translate such user interaction, through for example touch screen or other interface to actual interaction with the application being executed. A failure to do this reliably and in a manner that is evident to the user can lead to user disengagement with the product.

Such requirements are particularly challenging given the myriad or numerous and ever growing number of devices having varying hardware resources including input mechanisms that consumers wish to access such content on, particularly when considering a world-wide multi-national user base.

Further non-trivial problems also lie in the updating or "seeding" of the application and objects within the application displayed to a user, to ensure that some useful subsequent user interaction is valid.

SUMMARY OF THE INVENTION

According to a first aspect, there is provided a computer implemented method of controlling a user interface and displaying a game board arrangement, the method comprising the following implemented by at least one processor in communication with said interface and at least one memory: displaying a game board arrangement having a plurality of game objects each having one or more characteristics, information on said game board arrangement and said game objects being stored in said at least one memory, determining an initial selection of a first game object in dependence on user input via said user interface and in dependence on the stored information on said game board arrangement, determining a subsequent input selection of a second game object in dependence on user input via said user interface and in dependence on the stored information on said game board arrangement, executing an algorithm for determining the validity of the subsequent selection as being valid defined by said first and second game objects in dependence on a first direction of said sequence with respect to the game board arrangement, the length of said sequence and if the first and second game object have at least one same characteristic, updating said game board arrangement information such that all game objects of the determined valid sequence are eliminated, and displaying said updated game board arrangement.

According to a second aspect, there is provided a device having a user interface configured to display a game board having a plurality of game objects, at least one memory storing each game object having one or more characteristics, said user interface being configured to receive user input, and at least one processor in connection or communication with at least one memory configured to: display a game board arrangement having a plurality of game objects each having one or more characteristics, information on said game board arrangement and said game objects being stored in said at least one memory, determine an initial selection of a first game object in dependence on user input via said user interface and in dependence on the stored information on said game board arrangement, determine a subsequent input selection of a second game object in dependence on user input via said user interface and in dependence on the stored information on said game board arrangement, execute an algorithm for determining the validity of the subsequent selection as being valid defined by said first and second game objects in dependence on a first direction of said sequence with respect to the game board arrangement, the length of said sequence and if the first and second game object have at least one same characteristic, update said game board arrangement information such that all game objects of the determined valid sequence are eliminated, and display said updated game board arrangement.

In an embodiment, the algorithm for determining the validity of the subsequent selection sequence may return a valid indication to the at least one processor in dependence on the input sequence which may further comprise a change in direction from the first direction to a second direction.

In an embodiment, the change of direction may be determined to occur at an anchor object comprising a displayed game object sharing at least one same characteristic with said first game object.

In another embodiment, the first direction and second direction may be orthogonal to each other.

In yet another embodiment, the algorithm for determining the validity of the subsequent selection sequence may return a valid indication to the at least one processor in dependence on the input sequence having a length of at least two game objects.

In yet another embodiment, the algorithm for determining the validity of the subsequent selection sequence may return a valid indication to the at least one processor in dependence on the input sequence further comprising two or more anchor objects.

In another embodiment, the algorithm for determining the validity of the subsequent selection sequence may return a valid indication to the at least one processor in dependence on the input sequence further comprising a change of direction at each anchor object.

In yet another embodiment, the algorithm for determining the validity of the subsequent selection sequence may return a valid indication to the at least one processor in dependence on the input sequence comprising three anchor objects between the initially selected first game object and said second game object sharing the same first characteristic.

In yet another embodiment, the input sequence may be displayed to the user on said game board in dependence on the validity determination of said algorithm.

In another embodiment, the game board arrangement and information may comprise further game objects having further characteristics which may be stored in said at least one memory.

In an embodiment, the further game object characteristics may comprise activation of said characteristics when said algorithm determines that at least one further game object is selected in said input sequence.

In another embodiment, the characteristics of said further objects when activated may comprise eliminating game objects in at least one different direction to the first or second direction of the input sequence activating said further object.

In yet another embodiment, an activation of said further object in a sequence including a first direction selecting the further object may comprise eliminating all game or further objects in a row or column of said game board in an orthogonal direction to said first direction.

In an embodiment, said processor may select game objects to replace said eliminated game objects including said further game objects in said valid sequence based on the current game board state.

The game state may comprise a count of one of more of current game or further game objects, current game or further game object characteristics, available input sequences and other game board arrangement information.

In yet another embodiment, the count may be compared against a threshold to determine whether to replace the eliminated game objects with the selected game objects or whether to make a new selection of game objects. The threshold may be determined by multiple testing and or online monitoring of user inputs to determine an appropriate threshold.

The threshold may be modified over time in dependence on the monitored and collected user data and or user feedback.

The further game objects may be introduced to the game board based on criteria comprising one or more of a time interval, time played, time remaining.

In an embodiment, the time interval may comprise about 30 s.

The game board may comprise a food theme, with the game objects representing dishes to be presented to customers, and the further game objects comprising boosters with rotating line blasting characteristics, cakes that destroy all objects on the game board sharing a same characteristic (for example all coffee items), and "main courses" which may be indicated to the user to be desired by the customer, and the feeding of which provides bonus in the form of further game objects for example.

Examples of such food based boosters may comprise a graphical representation of a hotdog, cake, main course or other such food items as may be appropriate for the application.

According to another aspect, there is provided a device having a user interface configured to display a game board having a plurality of game objects, at least one memory storing each game object having one or more characteristics, said user interface being configured to receive user input, and at least one processor in connection or communication with at least one memory configured to receive an initial selection of at least one game object having a first characteristic with respect to said displayed game board in response to user input, detect a subsequent input selection sequence in a first direction with respect to said game board from said initially selected game object to at least another game object having said same first characteristic, determine the validity of the subsequent selection sequence as being valid in dependence on said sequence including at least one game object having at least a different characteristic to said first characteristic between said initially selected game object and said another game object, and eliminate all game objects of said sequence on said displayed game board with respect to said input.

In an embodiment, the at least one memory may store further game objects having further characteristics for display on said game board.

According to another aspect, there is provided a computer readable storage device storing program code instructions that, when executed by at least one processor in communication with a user interface and at least one memory, causes the at least one processor to: determine a subsequent input selection of a second game object in dependence on user input via said user interface and in dependence on the stored information on said game board arrangement, execute an algorithm for determining the validity of the subsequent selection as being valid defined by said first and second game objects in dependence on a first direction of said sequence with respect to the game board arrangement, the length of said sequence and if the first and second game object have at least one same characteristic, update said game board arrangement information such that all game objects of the determined valid sequence are eliminated, and display said updated game board arrangement.

According to yet another aspect, there is provided a program comprising program code instructions that, when executed by at least one processor in communication with a user interface and at least one memory, causes the at least one processor to: determine a subsequent input selection of a second game object in dependence on user input via said user interface and in dependence on the stored information on said game board arrangement, execute an algorithm for determining the validity of the subsequent selection as being valid defined by said first and second game objects in dependence on a first direction of said sequence with respect to the game board arrangement, the length of said sequence and if the first and second game object have at least one same characteristic, update said game board arrangement information such that all game objects of the determined valid sequence are eliminated, and display said updated game board arrangement.

In an embodiment, the determination of the validity of the subsequent selection sequence may further comprise the input sequence changing direction from the first direction to a second direction at an anchor object.

The first direction and second direction may be orthogonal to each other.

The anchor object may be a game object sharing said same first characteristic with said initially selected object.

The selection sequence may comprise two or more anchor objects.

In an embodiment, the selection sequence may comprise three anchor objects between the initially selected game object and said another game object sharing the same first characteristic.

The input sequence may be displayed to the user on said game board in dependence on the validity determination, thereby indicating to the user valid sequences of input.

In yet another embodiment, the game board may comprise further game objects having further characteristics.

The further game object characteristics may comprise activation of said characteristics when selected in said sequence.

In an embodiment, the characteristics of said further objects when activated may comprise eliminating game objects in at least one different direction to the first or second direction of the input sequence activating said further object.

In yet another embodiment, an activation of said further object in a sequence including a first direction selecting the further object may comprise eliminating all game or further objects in a row or column of said game board in an orthogonal direction to said first direction.

Said further game objects may be introduced to the game board based on criteria comprising one or more of a time interval, time played, time remaining.

In an embodiment, the time interval may comprise about 30 s.

The game board may comprise a food theme, with the game objects representing dishes to be presented to customers, and the further game objects comprising boosters with rotating line blasting characteristics. One example of such a food based booster comprises a graphical representation of a hotdog.

According to another aspect, there is provided a computer implemented method of controlling a user interface and displaying a game board arrangement, the method comprising the following implemented by at least one processor in communication with said interface and at least one memory: displaying a game board arrangement having a plurality of game objects each having one or more characteristics, information on said game board arrangement and said game objects being stored in said at least one memory, determining an initial selection of a first game object in dependence on user input via said user interface and in dependence on the stored information on said game board arrangement, determining a subsequent input selection of a second game object in dependence on user input via said user interface and in dependence on the stored information on said game board arrangement, determining the validity of the subsequent selection as being valid to eliminate the selected objects from the game board arrangement, selecting game objects to replace said eliminated game objects based on the current game board state.

In embodiment of the above aspect, the game state may comprise a count of one of more of: current game or further game objects, current game or further game object characteristics, available input sequences.

The count may be compared against a threshold to determine whether to replace the eliminated game objects with the selected game objects or whether to make a new selection of game objects.

According to another aspect, there is provided a device having a user interface configured to display a game board having a plurality of game objects, at least one memory storing each game object having one or more characteristics, said user interface being configured to receive user input, and at least one processor in connection or communication with at least one memory configured to receive an initial selection of at least one game object having a first characteristic with respect to said displayed game board in response to user input, detect a subsequent input selection sequence in a first direction with respect to said game board from said initially selected game object to at least another game object having said same first characteristic, determine the validity of the subsequent selection sequence as being valid in dependence on said sequence including at least one game object having at least a different characteristic to said first characteristic between said initially selected game object and said another game object, and eliminate all game objects of said sequence on said displayed game board with respect to said input.

In an embodiment, the at least one memory may store further game objects having further characteristics for display on said game board.

The further game object characteristics may comprise activation of said characteristics when said further game object is selected in said input sequence.

In an embodiment, the characteristics of said further objects when activated may comprise eliminating game objects in at least one different direction to first direction of the input sequence activating said further object.

The activation of said further object in a sequence including a first direction selecting the further object comprises may comprise eliminating all game or further objects in a row or column of said game board in an orthogonal direction to said first direction.

Other aspects and features are described with reference to the appended claims.

BRIEF DESCRIPTION OF DRAWINGS

To understand some embodiments, reference will now be made by way of example only to the accompanying drawings, in which.

DETAILED DESCRIPTION OF THE INVENTION

Figure 1:
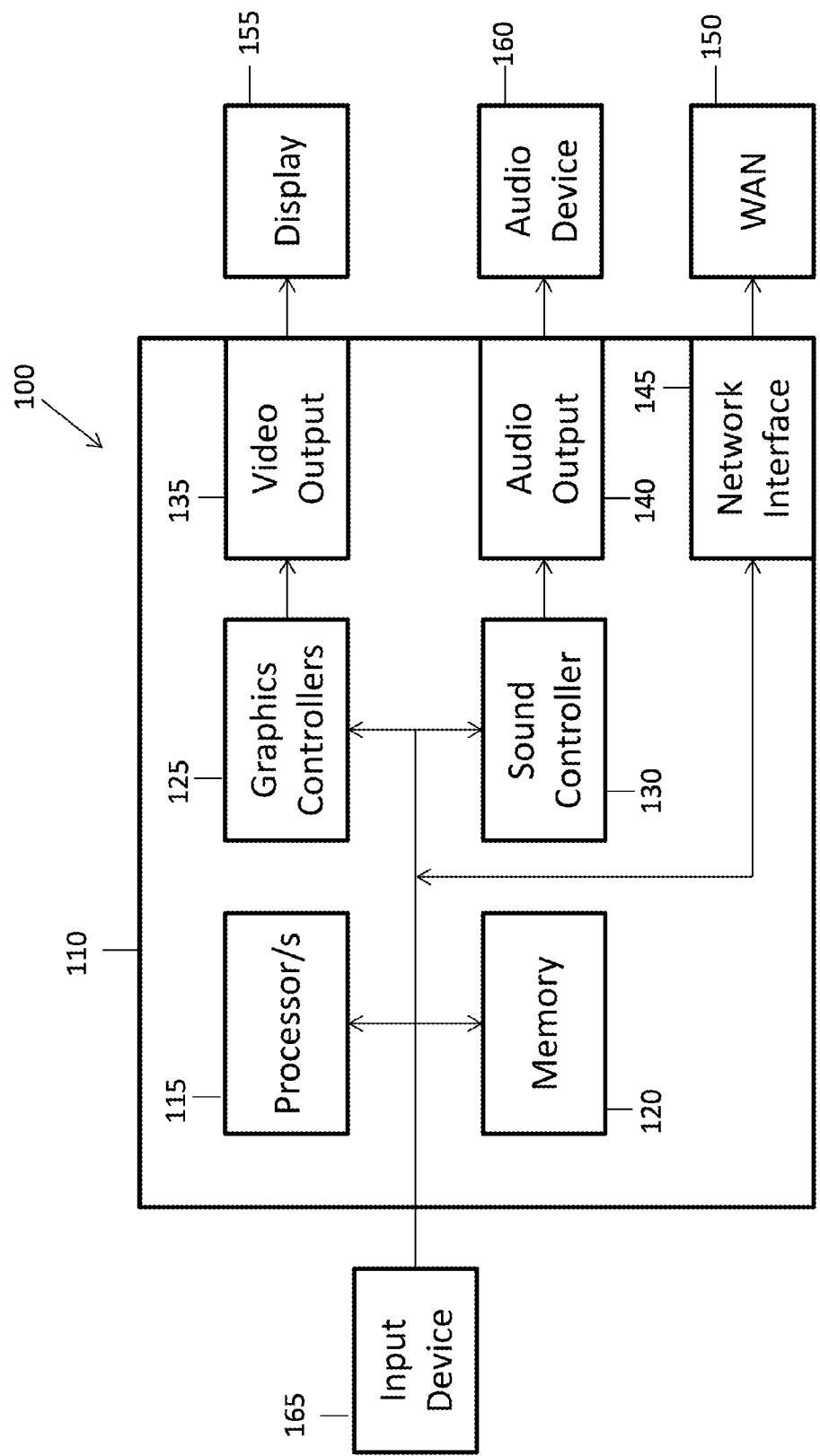
FIG. 1 shows an example client or user device of an embodiment.

Computer games, and in particular so-called "casual games", which fit into the busy or hectic lifestyle of a consumer, are popular. The inventors have realised that there are many technical challenges and technical considerations for such a market, in particular in designing algorithms which engender user engagement (and thus repeat use or play) across a plethora of available user devices which have different hardware and may run differing operating systems. In particular, the inventors have realised that robust algorithms for detecting an analysing input reliably across such a spectrum of devices is required.

An example of a user or consumer device will now be described with reference to FIG. 1, which illustrates a schematic view of a client or user device 100 according to an embodiment. All of the blocks shown are implemented by suitable circuitry. The blocks may be implemented in hardware and/or software. The user device may have a control part 110. The control part 110 has one or more processors 115 and one or more memories 120. The control part 110 is also shown as having a graphics controller 125 and a sound controller 130. It should be appreciated that one or other or both of the graphics controller 125 and sound controller 130 may be provided by the one or more processors 115.

The graphics controller 125 is configured to provide a video output 135. The sound controller 130 is configured to provide an audio output 140. The controller 110 has an interface 145 allowing the device to be able to communicate with a network 150 such as the Internet or other communication infrastructure.

The video output 135 is provided to a display 155. The audio output 140 is provided to an audio device 160 such as a speaker and/or earphone(s).

The device 100 has an input device 165. The input device 165 can take any suitable format and can be one or more of a keyboard, mouse, touch screen, joystick or game controller. It should be appreciated that the display 155 may in some embodiments also provide the input device 165 by way of an integrated touch screen for example.

The blocks of the controller 110 are configured to communicate with each other by an interconnect such as a bus or any other suitable interconnect and/or by point to point communication.

It should be appreciated that in some embodiments, the controller 110 may be implemented by one or more integrated circuits, at least in part.

The user device 100 is shown by way of example only. In alternative embodiments, one or more of the parts may be omitted. Alternatively or additionally, some embodiments may comprise one or more other parts. Alternatively or additionally, one or more parts may be combined.

Figure 2:
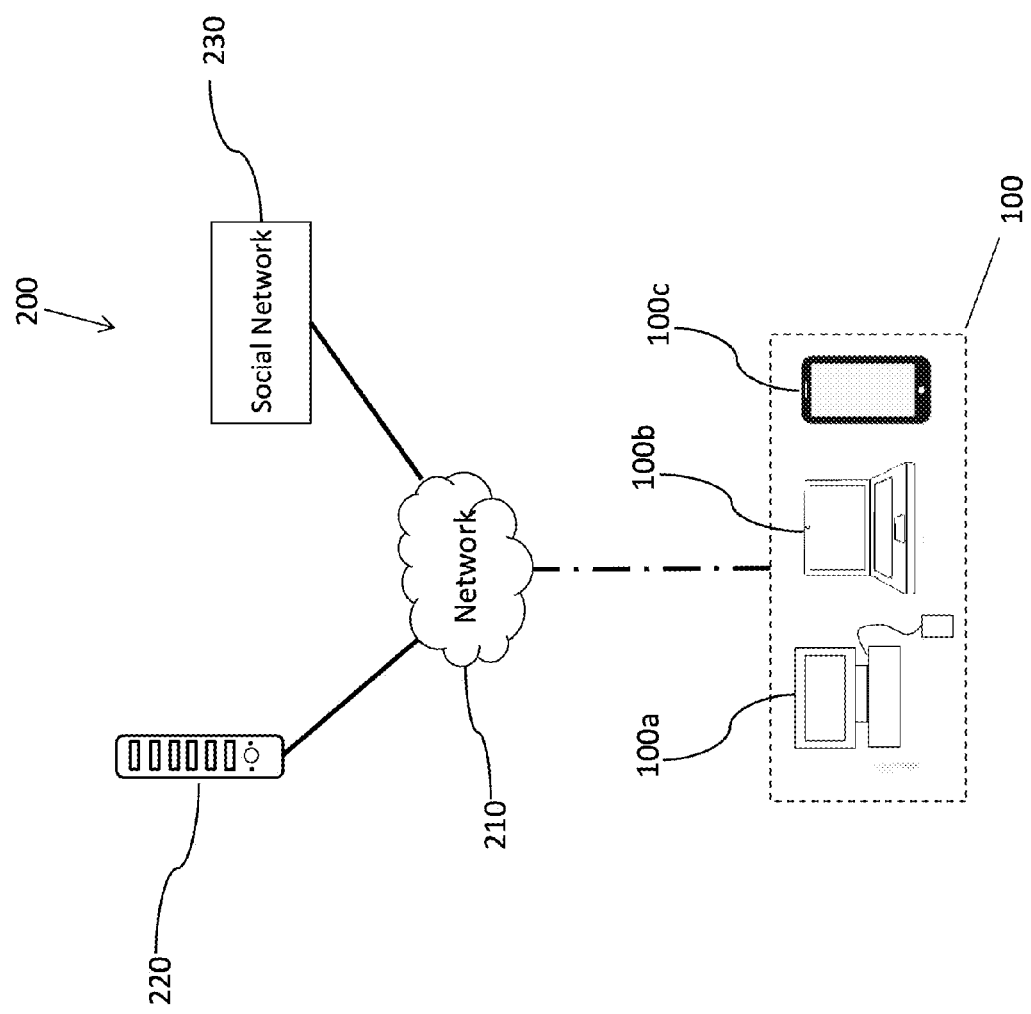
FIG. 2 illustrates an example system in which some embodiments may be provided.

FIG. 2 schematically shows a system 200 in some embodiments in which the user device 100 may communicate. The system 200 comprises a server 220 which may store databases of game player's details, profiles, statistics, etc. In practice, one or more databases may be provided. Where more than one server is provided, the database(s) may be provided in one database or across two or more servers. The server may also have a games data function. This may comprise one or more units of memory to store the computer game program and user behaviour data, and a processor to run the games program and process the user behaviour data.

The server 220 may communicate via for instance the internet 210 to one or more user devices 100, shown in the figure by way of example as user devices 100a, 100b and 100c, and may further provide connections to a social network 230 such as facebook™.

It should be appreciated that embodiments may be deployed in different system architectures. For example, the computer game may be implemented as a computer game that is stored in the memory 120 of the user device 100 and is run on the processor 115 of the user device 100. However, the server 220 may handle some elements of the game in some embodiments. By way of example only, a Java game applet may be provided to the user device 100 and the locally running Java applet will generate, for example, the graphics, sounds, and user interaction for the game play on the user device 100. Some data may be fed back to the server 220 to allow interaction with other players. The data which is fed back may also allow scoring and/or cross platform synchronization.

In some embodiments, the game may be implemented as a computer program that is stored in a memory of the system, for example the server 220, and which runs on a processor of the game server. Data streams or updates are supplied to the user device 100 to allow the user device 100 to render and display graphics and sounds in a browser of the user device 100. Such an approach is sometimes referred to as a web services approach. It should be appreciated, however, that such an approach does not necessarily require the use of the Internet.

The inventors have realised that an algorithm which robustly determines valid inputs on a user device from a user is required. This requirement also applies regarding the user expectation of carrying progress in an application or game across varying user device 100 and system 200 environments. For example, the user may switch from playing a game on their smartphone 100c to their tablet or laptop device 100b with similar expectations regarding at least user input mechanics.

Figure 3:
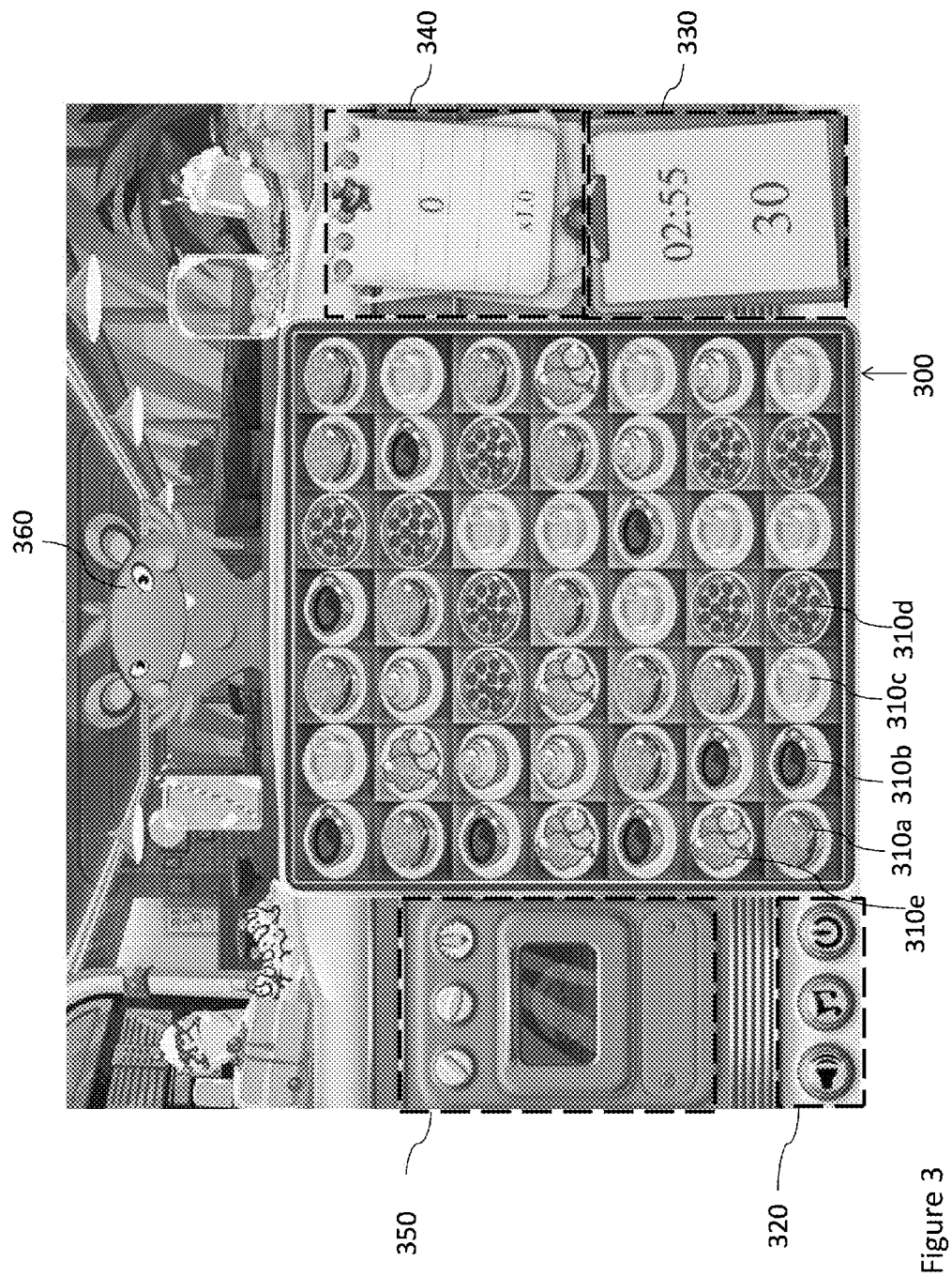
FIG. 3 shows an example game board according to some embodiments.

FIG. 3 shows an embodiment by way of example only, of a computer program game called "Blob's Diner" of the applicant, in which the appropriate computing algorithms may be embodied as will be described later.

FIG. 3 illustrates a game area or game board 300, upon which are disposed game objects 310a, 310b, 310c, 310d which have varying characteristics. In this embodiment, the game objects have characteristics which comprise one or more of object type, colour, graphical representation. In this example, the objects 310a, 310b, 310c, 310d have characteristics which define the objects as differently coloured and shaped food items as shown in FIG. 3.

There may also be provided a player selection indicator (not shown in the figure) which may be a representation of a pointer or hand in some embodiments, and may or may not be displayed to a user in some embodiments utilizing intuitive touchscreen or gesture recognition hardware. The device 100a, 100b, 100c has a user interface comprising video output 122, 135, 155 and input 165 which provides a selection mechanism for selecting a plurality of game objects 310a, 310b, 310c, 310d, for example "clicking" and/or "switching" via a mouse or other input device, or for example a "touch and/or move" or slide mechanism for inputting a selection sequence of displayed first game objects 310a, 310b, 310c, 310d.

The exact mechanism may be according to the computing or user device resources provided as described in FIGS. 1 and 2, and may for example comprise a "touchscreen" of a so called "smartphone" or other portable device 100a, 100b, 100c. The user devices 100a, 100b, 100c are by way of example only, and those skilled in the art will readily appreciate that other consumer devices may comprise head mounted devices such as for example "Google Glass"™ or "Oculus Rift"™, wearable fitness devices in the form of watches or jewelry, or combinations of such with the aforementioned devices 100 to form a personal area network for example.

The game board 300 of FIG. 3 also shows, in this embodiment, information areas 330 and 340 comprising game information in the form of time elapsed and the number of remaining moves available to the user, and a current score area 340. In addition basic user device controls 320 are displayed as shown. An area 350 is provided, displayed as an oven here, although other graphical representations of area 350 may be appropriate as per the context of the game. The area 350 indicates further game objects 710 with further or differing or special characteristics as compared to game objects 310a, 310b, 310c, 310d that will be described in more detail later.

Game objects 310a, 310b, 310c, 310d may be removed from the game board 300 via detection and determination of a valid user input selection.

The game object characteristics may comprise for example the graphical representation of that object, a different graphical representation of the object depending on game board information, the type of object, the size or configuration of the object, the colour or colours of the object and so on. The characteristics may also define activation or other behavioural characteristics of the game objects as will be described later.

Embodiments of various processes and associated algorithms executable by said at least one processor 115, 220 will now be described with reference to the flowcharts of FIGS. 4 to 7.

Figure 4:
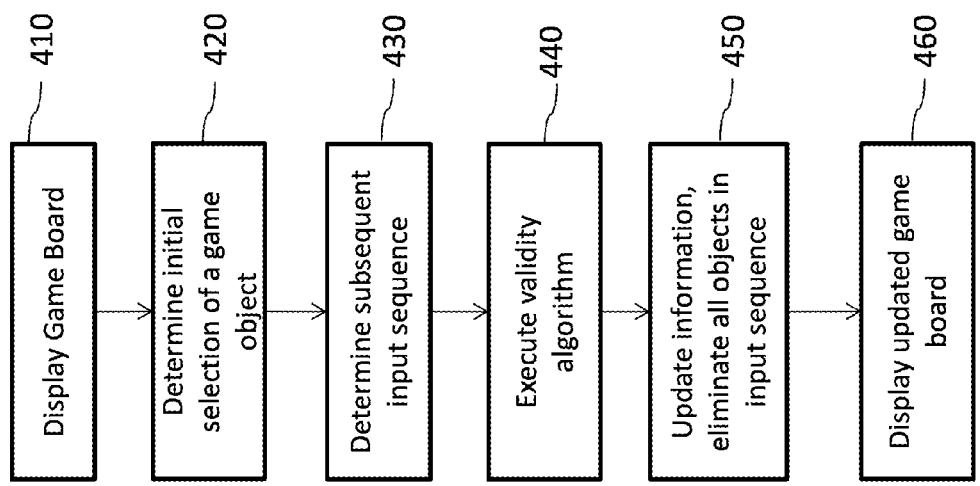
FIG. 4 is a flowchart illustrating steps of a method according to an embodiment.

FIG. 4 illustrates a process embodiment in which at step 410 the at least one processor 115, 220 displays the game board 300. The at least one processor 115, 220 subsequently monitors at step 420 for an initial selection of a game object 310a, 310b, 310c, 310d and once received the processor 115, 220 detects a subsequent input sequence 420a, 420b at step 430.

The processor 115, 220 then proceeds to step 440 where the input sequence is analysed via the execution of a validity algorithm to determine whether the sequence is a valid input. Examples of the algorithms for such determination will be described below with reference to FIGS. 5 and 6.

In one embodiment, a valid input response, via the validity algorithm comprises the processor determining where the sequence began on the interface, associating a likely game object as the initial or first selected game object with the position of the beginning of the input sequence based on the game board arrangement information, and determining that the sequence ended on a second game object sharing the same characteristic as the initially selected game object, and that the sequence was of a valid direction and valid length.

In one embodiment the valid direction comprises a vertical or horizontal direction between the first and second selected game objects and with respect to the game board arrangement.

In another embodiment the valid length of the input sequence comprises input including at least two consecutive game objects.

For example, the length of the sequence may be comprised of the touch input trajectory length in pixels for example, or the length may be comprised of the number of game objects within the sequence, which may be deduced by the processor 115, 220 by comparing the input trajectory with the width of game object information stored in said memory as part of the game board arrangement information.

Hence, the algorithm determines a valid input sequence having at least a final or end game object matching or sharing at least one of the characteristics of the initially selected object, the selection being in a valid direction and of valid length.

For example, if both objects 310d share the same colour, or type (e.g., food and drink items with respect to FIG. 3 application), and the input sequence Once the validity of the input sequence at step 440 is determined to be true, then the game board information is updated and all game objects 310a, 310b, 310c, 310d in the input sequence are eliminated at step 450.

The game board information may be updated by being refreshed or refilled either from area 350 at certain time intervals, or new game objects are selected to replace those eliminated in dependence on a seeding algorithm which shall be described later (FIGS. 13A, 13B) and replaced in a top down fashion.

The updated game board arrangement comprising the updated information is subsequently displayed at step 460.

Figure 5:
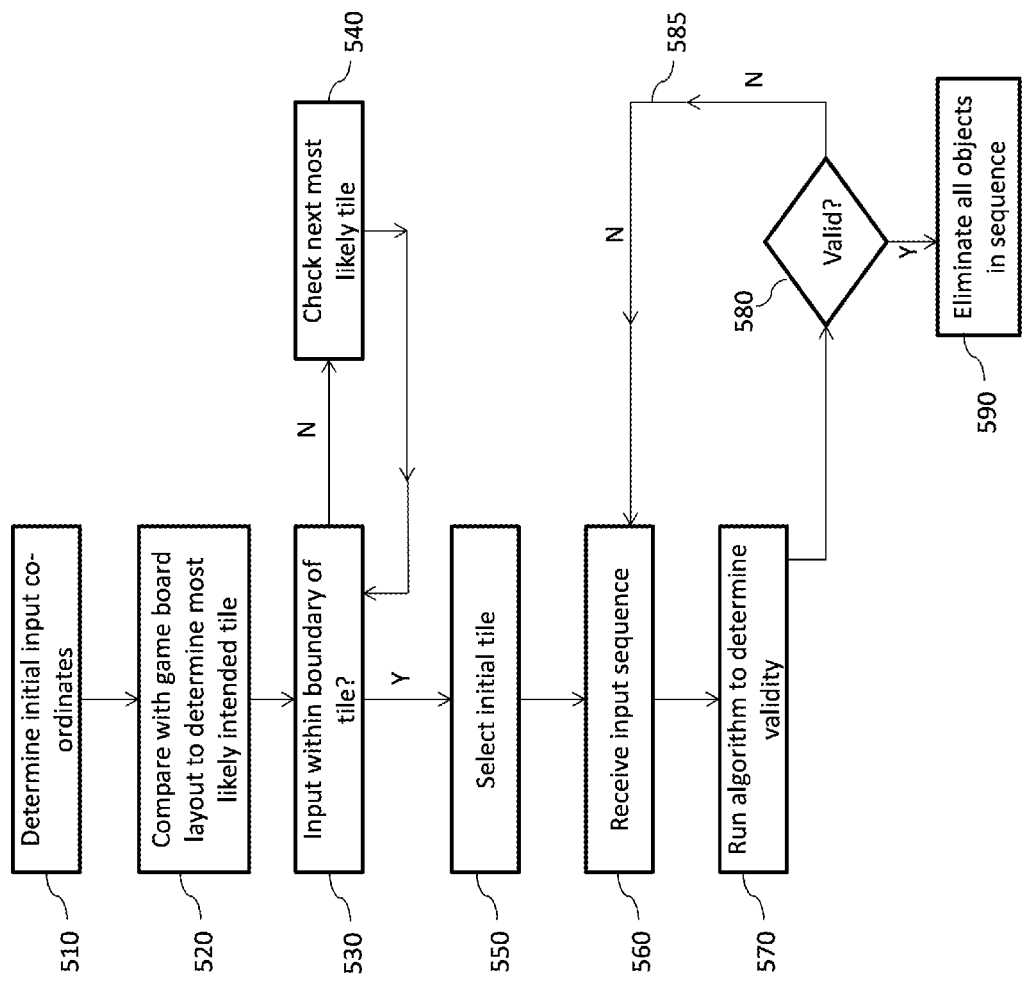
FIG. 5 is a flowchart illustrating an algorithm according to an embodiment.

FIG. 5 illustrates a process embodiment in which initial input co-ordinates are retrieved at step 510 in dependence on an initial selection or input by the user.

The at least one processor 115. 220 subsequently compares the received input coordinates and the game board layout to determine the most likely intended selection tile at step 520.

In one embodiment, this determination may be carried out as indicated at step 530 wherein the input is compared with a tile boundary according to the game board layout to determine the most likely intended tile. The game board layout including for example tile boundaries may be stored in memory and retrieved by the at least one processor 115, 220 when determining if the input selection falls within the boundary. If the input falls on a border of a tile boundary, or is otherwise ambiguous, then the processor 115, 220 may determine the next most likely tile intended for selection at step 540.

For instance, the next most likely tile may be selected in dependence on a comparison of the input co-ordinates with a respective boundary of a tile, and if within a predetermined factor then the next nearest tile is selected. By way of example, an input near to, i.e. within the factor of the right most boundary, or on the right most boundary of a tile may result in the selection at step 540 of the tile to the right of that within which the received initial input co-ordinates fell.

The factor may be a proportion or percentage of the tile size in pixels as rendered by the device, thereby allowing for different resolutions and screen sizes across multiple devices and platforms.

Once an initial tile is selected at step 550 then the at least one processor monitors to receive a subsequent input sequence at step 560.

The input sequence may comprise a "touch and move and release" or "click and drag and release" input depending on the particular input mechanisms and resources of the device. The sequence may comprise several tiles or object locations from the initial selection 310d to another object 310d matching the characteristics of the initially selected object 310d.

The at least one processor 115, 220, upon receiving said sequence subsequently executes an algorithm at step 570 to determine whether or not the sequence is a valid input sequence. The validity algorithm will be described in more detail below. If the algorithm returns a non-valid sequence result at step 580 then the processor returns via path 585 to monitor for input.

However, if the sequence is determined by said algorithm to be valid at step 580 then the at least one processor continues to step 590 where all objects selected in the valid sequence are eliminated or removed from the game board 300.

Hence, in some embodiments, only valid sequences may be input comprising for example a user touching their finger to the game board at a position corresponding to a first initial selection, with subsequent movement before release highlighted as to whether the sequence is valid, thereby enabling the user to understand which sequences are available and hence understand the particular mechanics for the application or game.

Figure 6:
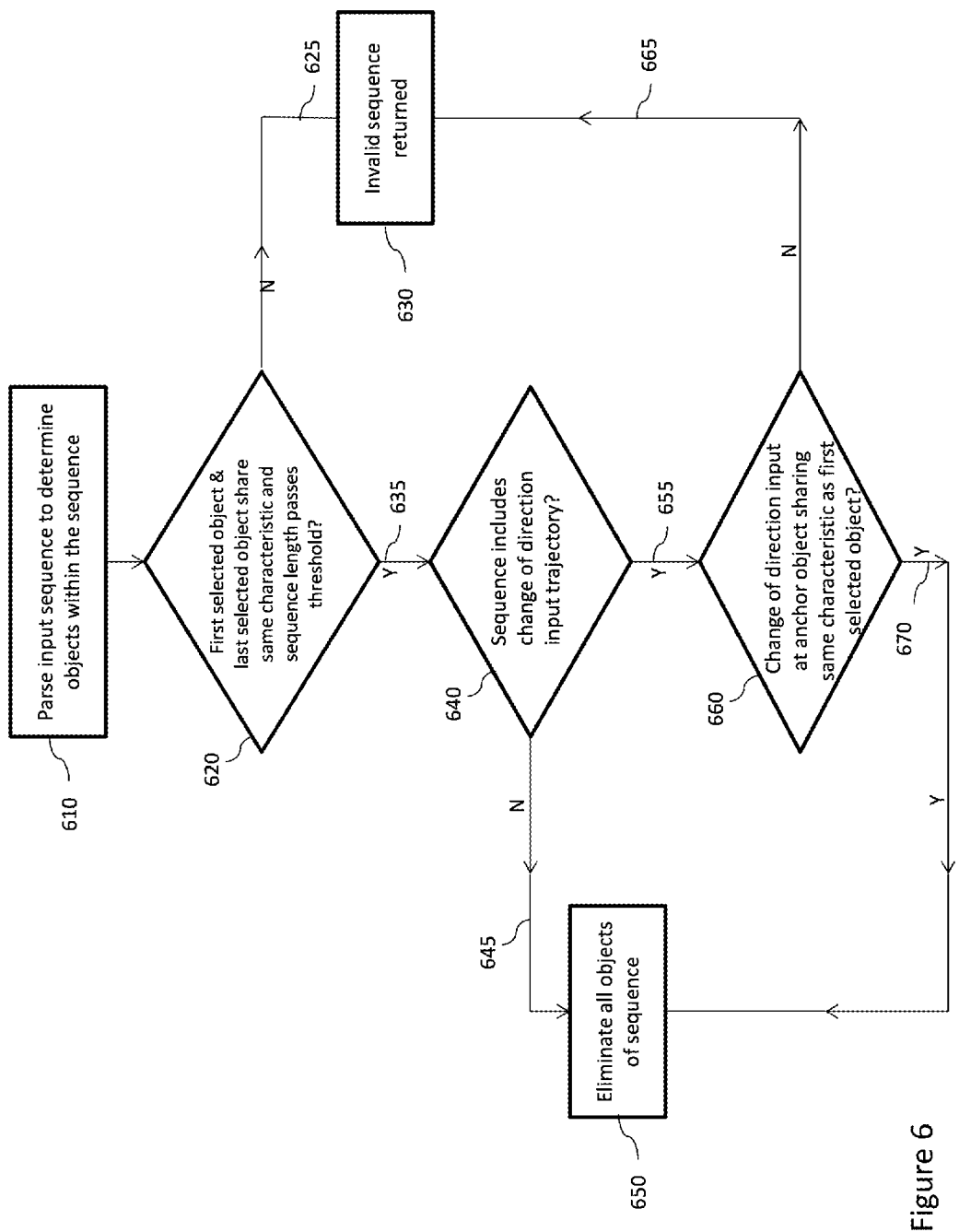
FIG. 6 is a flowchart illustrating an algorithm according to an embodiment.

FIG. 6 illustrates an embodiment of an algorithm to determine the validity of an input sequence, which may be utilised at step 570 of FIG. 5.

The at least one processor 115, 220 parses the input sequence to determine selected objects within the sequence, by for example mapping the received input co-ordinates of the input against the game board layout as previous described.

At step 620 the algorithm causes the at least one processor 115, 220 to check whether the initial first selected object and second or end selected object within the sequence match by for example sharing at least one same characteristic such as type. In the application example of FIG. 3 for example, the characteristic defining type may be "pizza" to correspond to objects 310*d*. The processor 115 also checks that the sequence is of sufficient length to pass a length threshold.

In an embodiment, the length of the sequence comprises at least two game objects.

If the processor determines that the sequence does not pass the checks, then the process follows path 625 to step 630 where an invalid sequence flag or indicator is returned to the process of FIG. 5. Hence, the sequence may be iteratively analysed in real time to aid the user in understanding what valid inputs are available.

If the conditions of step 620 are met, then the process flows via path 635 to decision step 640 in which the sequence is analysed for a change of direction of input trajectory.

If there is no change in direction or trajectory of tracked input, for example the user has simply selected a row or column of objects then the sequence is determined to be valid and the process flows via path 645 from step 640 to step 650 wherein all of the objects within the sequence are eliminated.

If there is a change of direction, and the change of direction occurs on a tile or object sharing the same characteristics as the initially selected object, then the sequence is determined to be valid and the process flows via path 670 from step 660 to step 650 wherein all of the objects within the sequence are eliminated.

However, if the change of direction does meet the criteria of the algorithm, for example the direction change occurs at a position corresponding to an object not sharing the same characteristics of the initially selected object, then the process flows via path 665 to step 630 where an invalid sequence is returned.

Hence, the algorithm enables multiple selections in a sequence of input with changes in direction at anchor objects within the sequence matching the initially selected object.

In an embodiment, the number of anchor objects may be limited, with the algorithm checking the number against the limit to determine a valid sequence.

Figure 7:
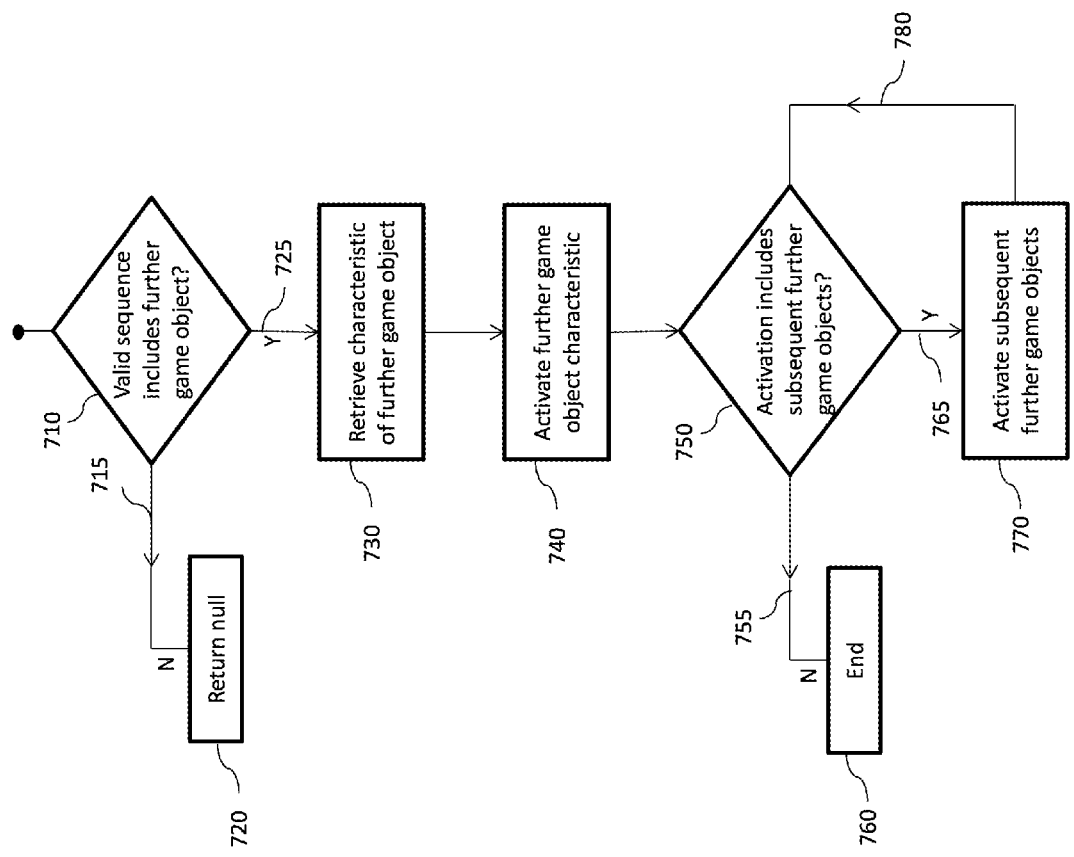
FIG. 7 is a flowchart illustrating another algorithm according to an embodiment.

FIG. 7 illustrates a further development of the algorithm wherein further game objects having different characteristics defining activation and behaviour and effect on the game board. Such items are sometimes referred to as "boosters" which aid the user in achieving the current goal of the application they are running.

At step 710 the validation check of the sequence causes the processor to determine whether one or more further objects are included in the input sequence, and simply returns a null indicator at step 720 via path 715.

If the sequence does however contain at least one further game object, the process continues from step 710 via path 725 to step 730 wherein the at least one processor 115, 220 retrieves the further characteristics of the further game object.

The elimination of the valid sequence of objects subsequently triggers the activation of the further game object characteristics, which may comprise line blaster, type bombs and bonuses as will be described in more detail later.

Once a further object is activated, the processor checks at step 750 for subsequent further game object(s) which may be activated depending on their retrieved characteristics by the activation of the previous further object, and subsequently activates such further game objects at step 780. The process loops back via path 780 to step 750, thereby providing a cascading step-wise activation of further objects with subsequent elimination in addition to the input sequence.

Examples of a valid input sequence according to the algorithms discussed above will now be described with reference to FIG. 8.

Figure 8:
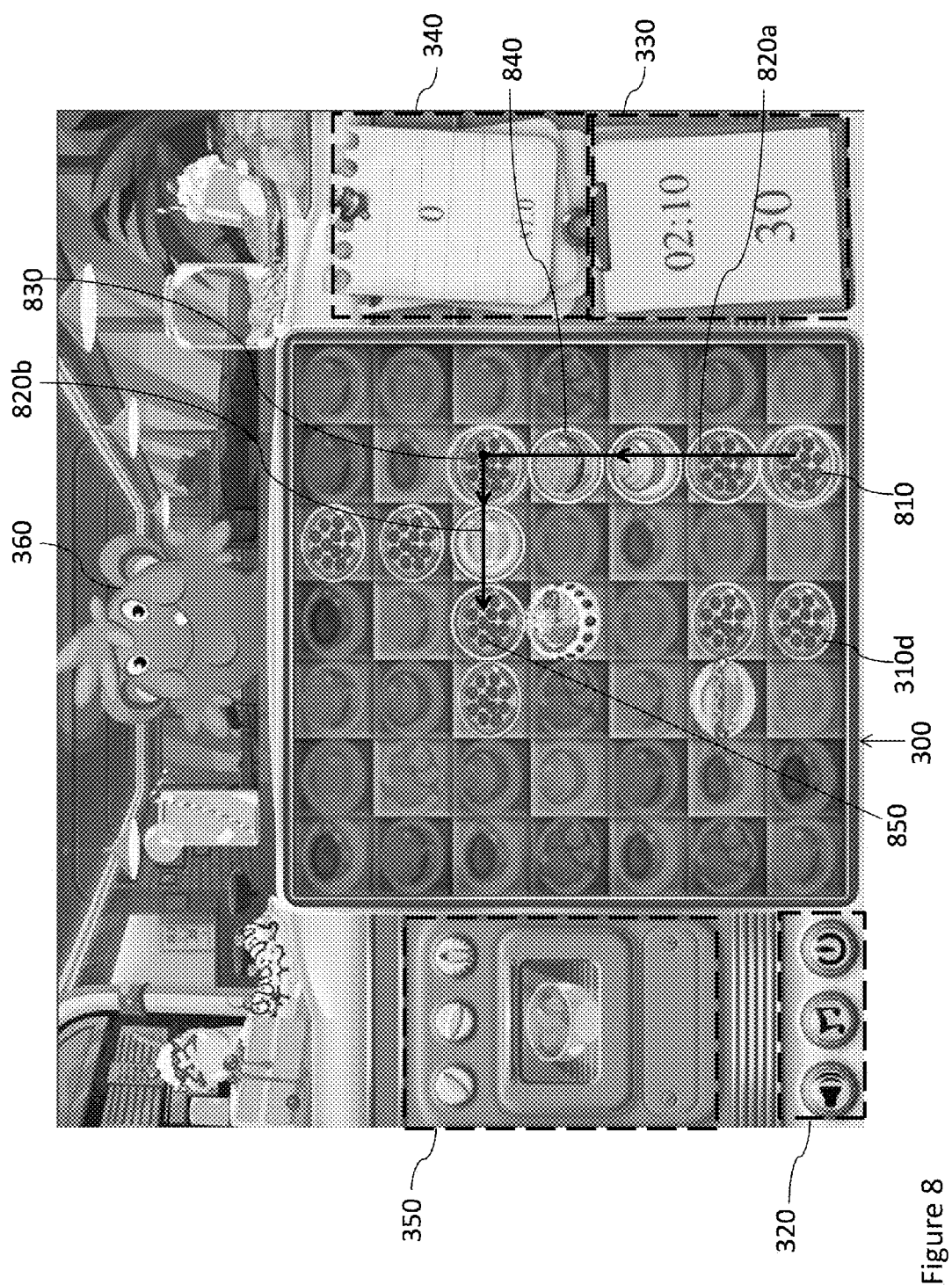
FIG. 8 illustrates a game board with an example valid input sequence.

FIG. 8 illustrates the game board of FIG. 3, overlaid with an input sequence 820*a*, 820*b* to aid understanding of the aforementioned described algorithms. The input sequence begins as shown with an initial selection of object 810 (which in this application has the characteristics to be displayed as a "pizza"). The sequence then tracks upwards on the game board in a first direction as indicated by arrow 820*a* to object 830.

Since object 830 matches the initial object 810, and the sequence includes at least one non-matching object 840 ("hamburger"), the sequence, should the user terminate input at that point 830, would be determined to be valid and the objects selected within the trajectory 820*a* would be eliminated.

Alternatively, the user may not choose to terminate input at object 830, but change direction from the first direction 820*a* to a second direction or trajectory 820*b* at point or object 830. In doing so the algorithm determines (step 640) that object 830 matches characteristics of the initially selected object 810 and hence can serve as an anchor point. The input may then continue in the second direction 820 until the user either terminates input at a matching object 850 (by for example simply lifting their finger from the touchscreen of their device 100) and or the maximum number of anchor points has been reached.

In some embodiments, the input sequence may cross over itself provided that each change of direction is validated at a matching anchor point.

In some embodiments the maximum number of anchor points may be limited. The limit may depend on the application, and may for example be in the range of 2-7, for example the limit may be 3 for a game board having a 7×7 or similar layout.

Figure 9:
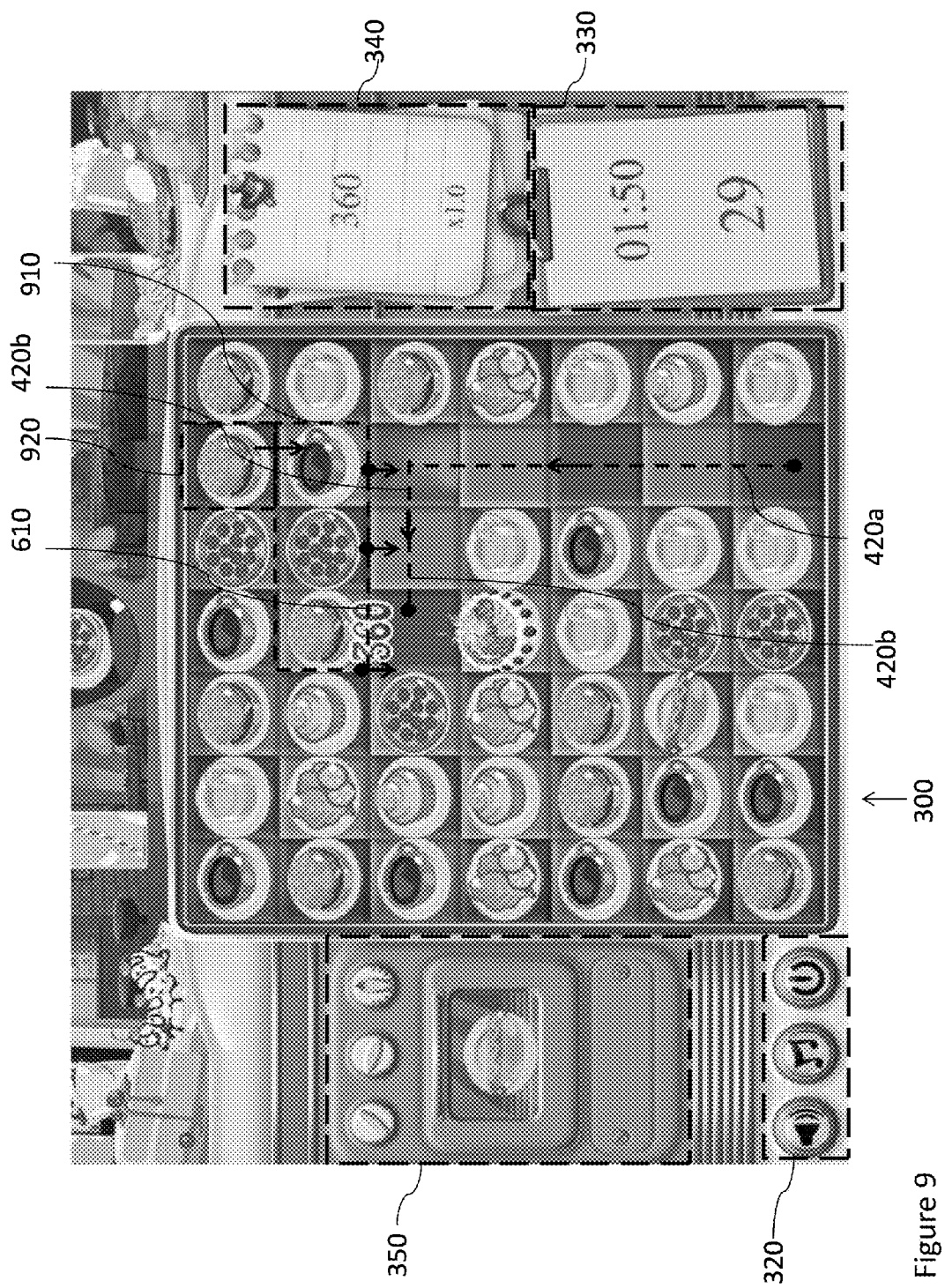
FIG. 9 illustrates the game board after activation of the input sequence of FIG. 8.

FIG. 9 shows the game board 300 of FIG. 8 once the input sequence 420*a*, 420*b* is ended and determined to be valid, in which all game objects of the sequence are eliminated returning a score 610 (in this example 360 points) to the user. In an embodiment, the objects occupying areas 910 and 920 may then cascade down the game board to replace the objects eliminated. New objects may then be selected to occupy the tiles vacated, as will be described later with reference to FIGS. 13*a* and 13*b*. Hence, an innovative selection mechanic is introduced which enables the sequence to alter direction at a matching or anchor game object thereby providing deceptively simple but engaging game play.

In an embodiment, more than one anchor point or object may be included in the sequence if available, thereby enabling multiple changes in direction.

The number of anchor objects per valid sequence is capped in some embodiments at three anchor points. Hence, a valid selection sequence may comprise up to five matching game objects 310*d*, with a change in direction at the second, third, and fourth game objects 310*d* serving as anchor points.

The directions in some embodiments are orthogonal to each other.

Whether or not an input sequence is valid may be displayed to the user during the input sequence. The sequence may not be input if not valid, and options may be highlighted or hinted to the user during the input sequence, thereby enabling engagement and understanding of the input mechanic and rules.

Further game objects having further characteristics may also be provided in some embodiments, as discussed in FIG. 7 and as will now be described with reference to FIGS. 10, 11 and 12.

Figure 10:
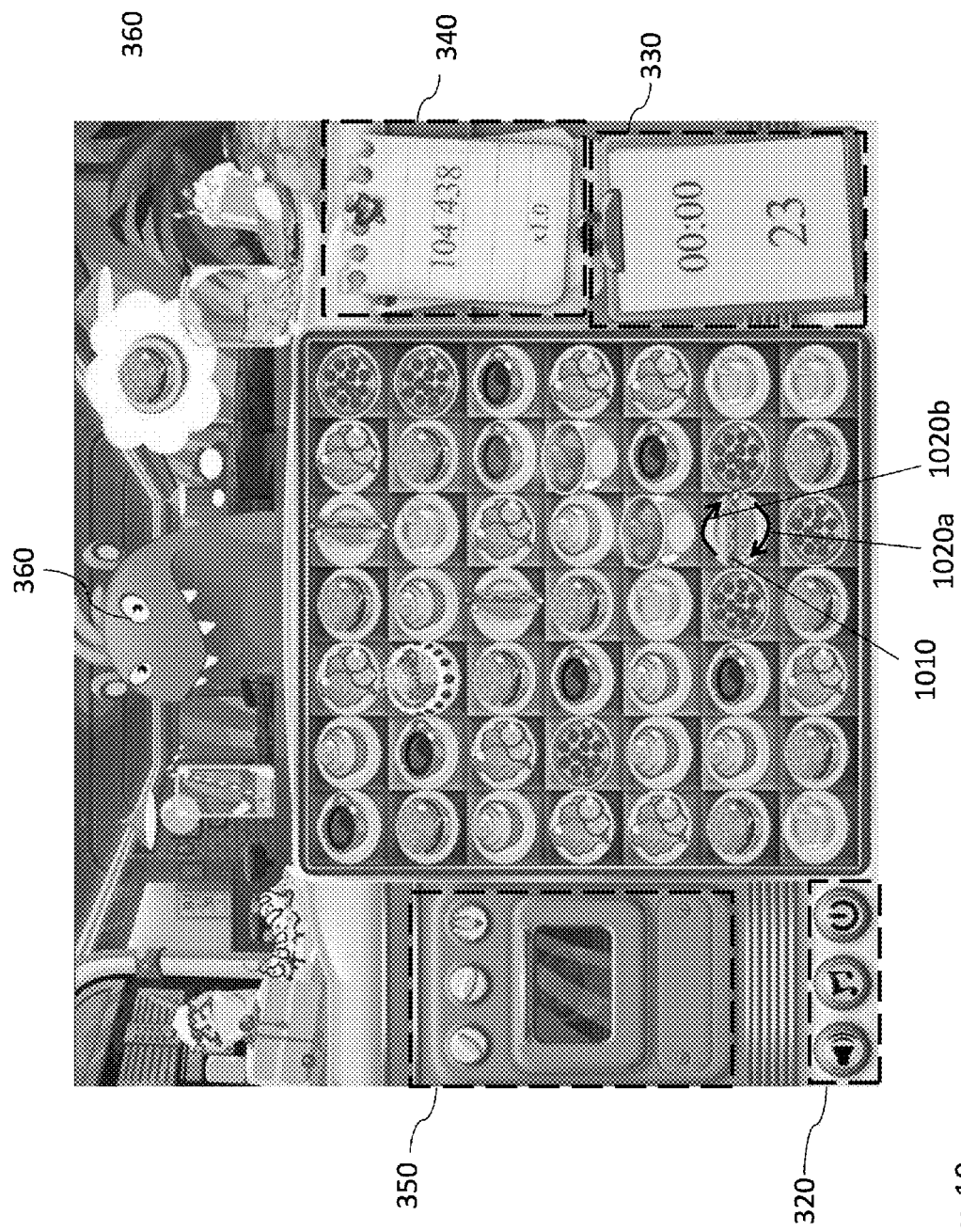
FIGS. 10 and 11 illustrate a game board having a further object and potential activation characteristics respectively.

FIG. 10 illustrates area 350 which supplies further game objects onto the game board 300. The area 350 has provided further game object 1010 which in this example is a graphical representation of a "hotdog". The actual representation may differ across various applications, games and platforms. Further game object 1010 has further characteristics which define its behaviour and the activation of that behaviour. For example, the object 1010 may have characteristics that cause the activation axis of said further object to alternate between different directions of the game board arrangement as shown by arrows 1020a, 1020b.

The different directions may be orthogonal to each other with respect to the game board arrangement, or they may be tangential.

In one embodiment object 1010 has a characteristic that will eliminate all game objects 310a, 310b, 310c, 310d on the same row or column of the game board depending upon its orientation when activated. The further game object 1010 may be activated when it is included in an input sequence as previously described, and hence will eliminate (or "line blast") those extra game objects 310a, 310b, 310c, 310d occupying the row or column in which the further game object 1010 was located.

In another embodiment, if activated in an input sequence 420, the further game object characteristics cause said elimination to be orthogonal to the input sequence 820a or portion of input sequence 820b if anchor objects are included in the sequence.

In yet another embodiment, the activation direction of said further game object, if activated secondarily or indirectly by a valid input sequence as described above, may be determined by the current direction indicator of said further game object when initiated or activated.

Figure 11:
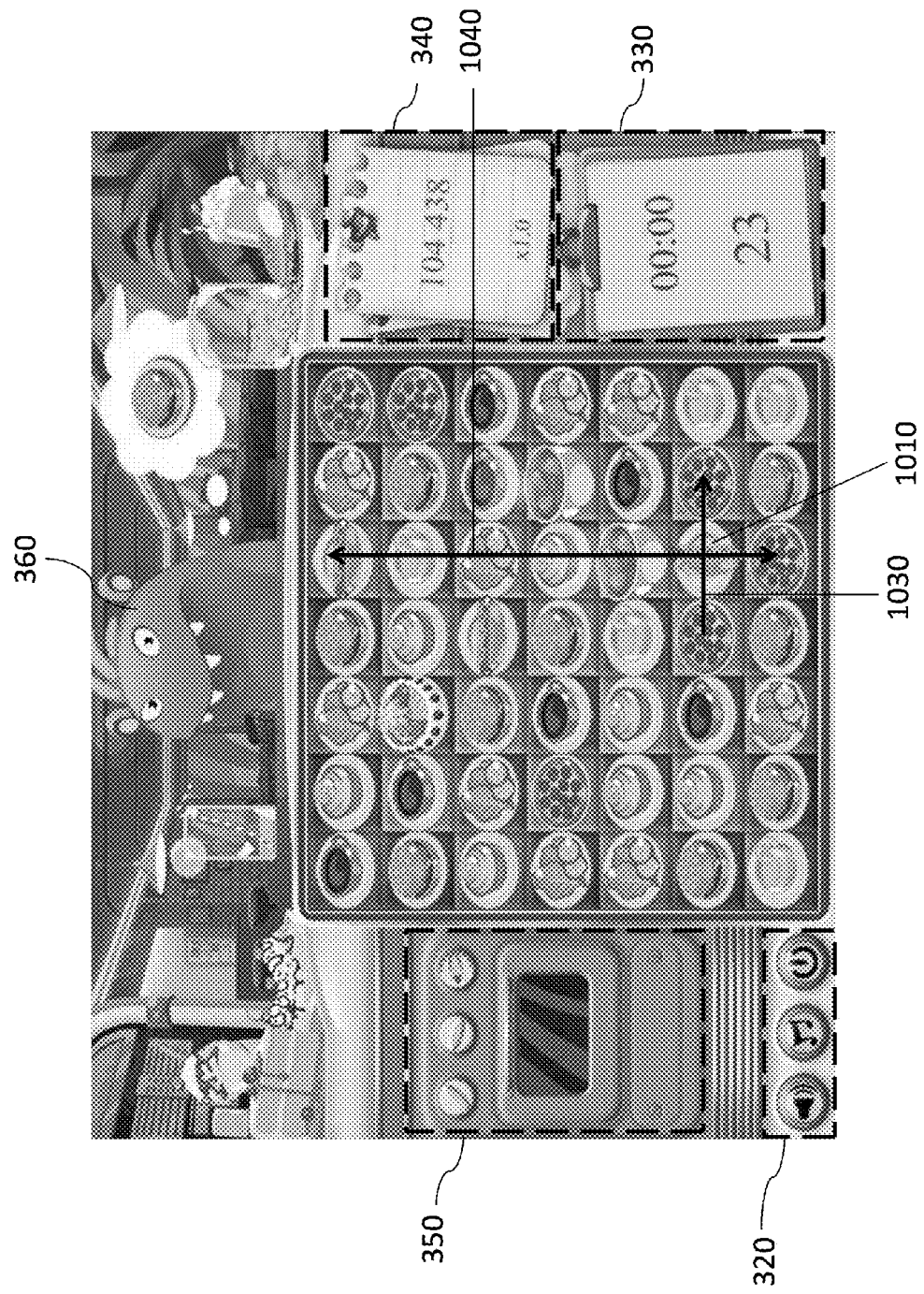

Hence, with reference to FIG. 11, a horizontal valid input sequence 1030 causes the activation of the further game object 1010 to eliminate all game objects in column 1040 as shown.

In another embodiment, the further game object activation direction is determined by said direction indicator current status information when the further object is indirectly activated.

Figure 12:
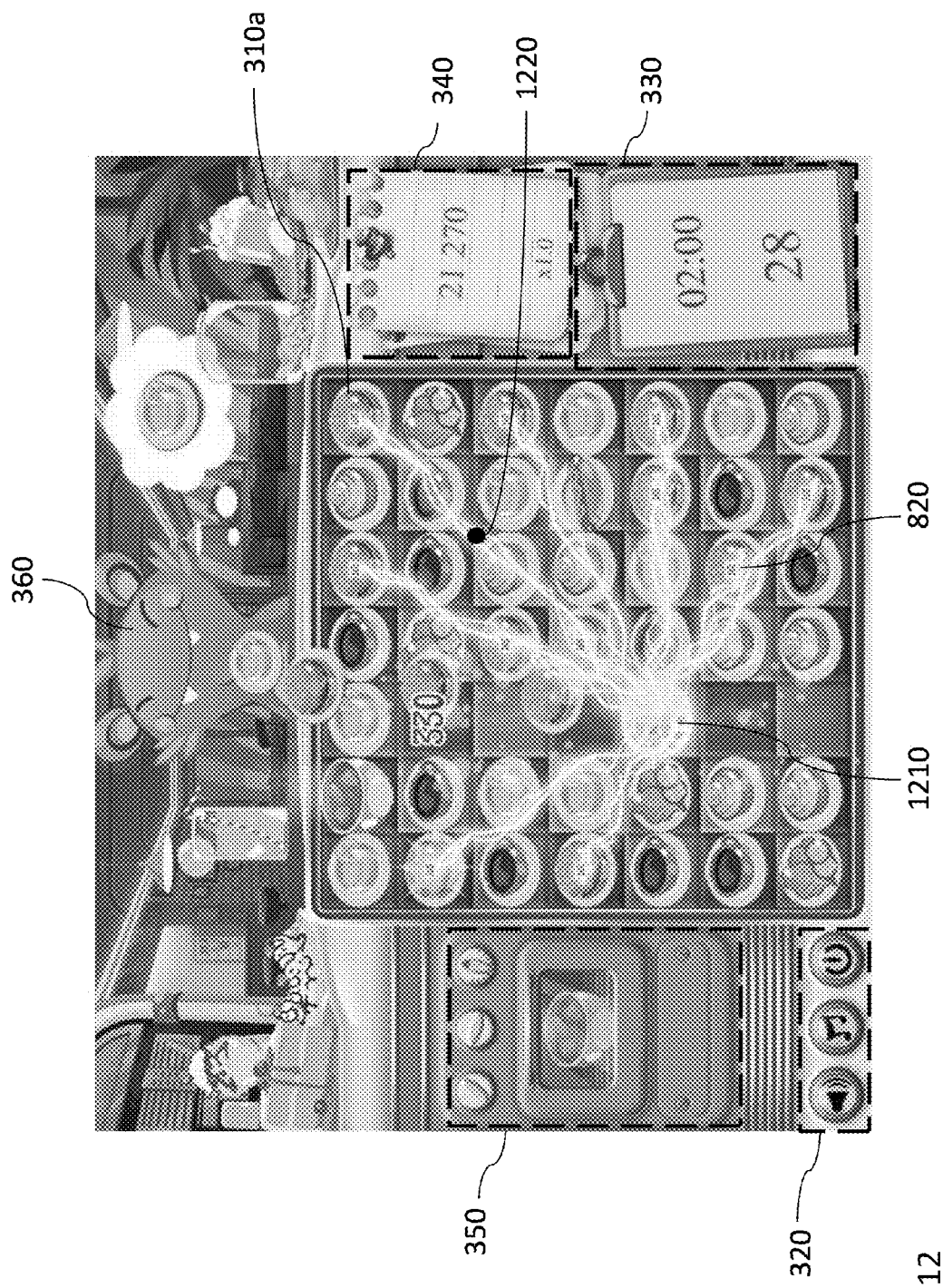
FIG. 12 illustrates a game board having another further object and potential activation characteristics.

Another embodiment of a further game object 1210 is shown in FIG. 12, in which the further game object 1210, when activated by inclusion in a selection sequence, eliminates all game objects 310a having the same characteristic from the game board 300. FIG. 12 illustrates the removal of "hamburger" game objects 310a in all directions and across the game board.

In an embodiment, the further object is graphically represented as a "cake", and the processor, in retrieving said further object characteristics, selects the game object characteristic to be removed when said cake object is activated based on the current game board arrangement and information.

For example, the game objects selected for elimination may comprise the same type, and the processor may evaluate the game board information and type to determine the number of such types currently displayed in dependence on game state variables such as current score, progress to goal (which may be a score), time remaining, moves remaining, time spent in level.

In an embodiment, the processor may be programmed to select the game object to eliminate based on the game board arrangement and information.

The selection of which game objects 310a, 310b, 310c, 310d to eliminate is determined in dependence on the initially selected game object in some embodiments. Alternatively, or additionally, the object 1010, 1210 may indicate to the user the game objects that will be eliminated, thereby providing a strategic element for consideration by the user in eliminating as many game objects as quickly as possible, for example, by attempting to include the further game object 1010, 1210 in the input sequence 820a, 820b.

In some embodiments the game objects 310b, 310c, or further game objects 1010, 1210 not selected or eliminated after an elimination event may cascade into spaces or tiles on the game board 300 previously occupied by the eliminated game objects.

In an embodiment, further game objects 1010, 1210, upon reaching the bottom of the game board 300 are then displaced to the top row of the game board 300 to prevent a build-up of further game objects 1010, 1210 which when activated would eliminate almost all of the game board thereby removing strategic input sequence selection (since the activation of one further object would activate others leading to a "chain reaction").

In fact, the inventors realised that such a problem is not constrained to the further objects alone, but in general relates to the refilling or seeding of the game board arrangement and information.

Figure 13B:
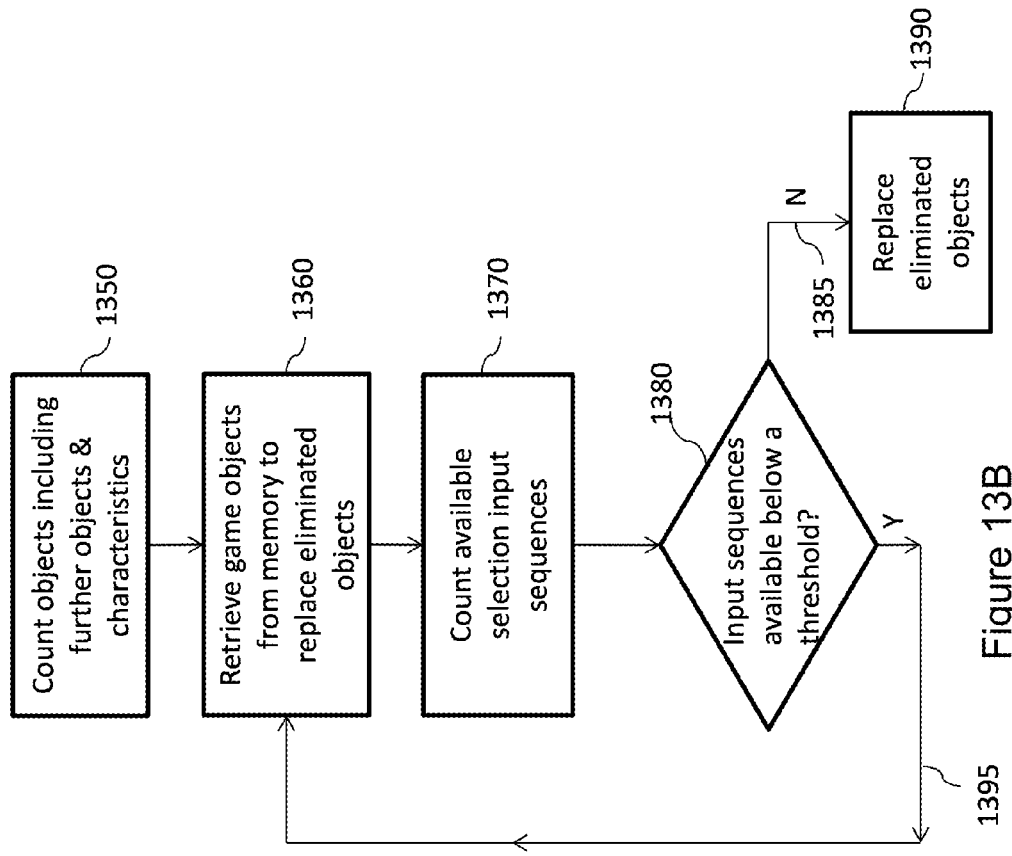
FIGS. 13A and 13B show a flowchart illustrating steps of a seeding and reseeding algorithm according to an embodiment.
Figure 13A:
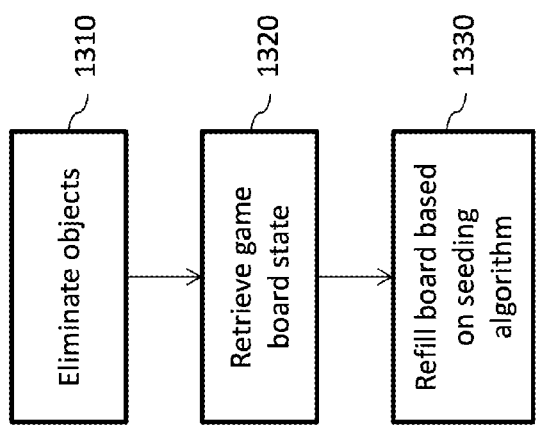

FIG. 13A illustrates a process by which, after elimination of the objects at step 1310, by for example user selection as previously described, the game board state is retrieved at step 1320. This may comprise the at least one processor 115, 220 parsing the game board objects for one or more of type characteristics, number of matching types in rows, columns, number of different types of objects.

The processor then proceeds to step 1330 where the game board is filled based on a seeding algorithm.

One embodiment of a seeding algorithm is provided in FIG. 13B. At step 1350 the at least one processor parses the game board and counts one or more of the number of objects, further objects and retrieves their associated characteristics from memory 120 to at least determine the number of objects that require replacing.

At step 1360 the processor subsequently retrieves, for instance randomly game objects from memory to replace those eliminated.

At step 1370 the processor analyses the new game board state including the proposed replacement game objects, by for example determining the number of valid selection input sequences available.

The number of sequences available may then be tested against a threshold at step 1380. The threshold may comprise an aggregate or statistical score derived from for example one or more of the number of valid input sequences, number of further objects on the game board, and positions with respect to each other.

If step 1380 returns a number or indicator below the threshold, then flow proceeds via path 1395 to step 1360 where the game objects to replace those eliminated are once more retrieved.

If step 1380 returns a number or indicator above the threshold, then flow proceeds via path 1385 to step 1390 where the game objects originally retrieved to replace those eliminated are provided to the game board.

Hence, game boards that are playable and do not disengage a user may be provided even though the initial retrieval of game objects to replace those eliminated may be randomly seeded.

The threshold may be based on user testing, and may be updated online as game play data becomes available, leading to intelligent, adaptive game boards.

Hence, an intuitive, sophisticated and engaging input mechanic is provided, which may be applied to other object matching scenarios with different contexts and rationale. Furthermore, the addition of further game objects with novel properties defined by behaviour and activation characteristics provide another challenge when considering input selection.

A person skilled in the art will realise that the different approaches to implementing the apparatus, systems, device and installations disclosed herein are not exhaustive, and what is described herein are certain preferred embodiments. It is possible to implement the way in a number of variations without departing from the spirit or scope of the invention.

The invention claimed is:

1. A computer implemented method for controlling a user interface and displaying a game board arrangement on a display, the method comprising executing on at least one processor, in communication with said user interface and at least one memory, the steps of:
   displaying on the display, a game board arrangement having a plurality of game objects each having one or more characteristics, information on said game board arrangement and said game objects being stored in said at least one memory,
   determining an initial selection of a first game object in dependence on user input received via said user interface and in dependence on the stored information on said game board arrangement,
   determining an input sequence of movement with respect to said game board, said input sequence of movement being defined by user input via the user interface, said input sequence being defined by the initial selection of said first game object, movement in a first linear direction from the first game object to an anchor game object and then movement in a second different linear direction from the anchor game object to a second game object to thereby select said second game object, at least one other game object being between at least one of:
      the first game object and the anchor game object in the first linear direction; and
      the anchor game object and the second game object in the second linear direction;
   executing an algorithm for determining a validity of the input sequence, said algorithm comprising: determining that said selection on said user interface began at said first game object having at least one characteristic, determining that said selection includes said anchor game object having at least one same characteristic, and determining that said selection ended on said second game object having at least one same characteristic,
   updating said game board arrangement information for a valid input sequence such that all said first, second, anchor, and at least one other game objects are removed from the displayed game board, wherein at least one of said at least one other game object have a different characteristic to said game characteristic, and
   displaying said updated game board arrangement.

2. The method according to claim 1, wherein the first linear direction and second linear direction are orthogonal to each other.

3. The method as claimed in claim 1, comprising detecting said user input defining movement in the first linear direction from the first game object to the anchor game object and then in a respective different linear direction to a respective further anchor game object, wherein there is one or more further anchor game objects with a change in linear direction being provided at the or each further anchor game object, said movement being from the further or a last of the further anchor game objects to said second game object,
   the at least one other game object being between at least one of:
      the first game object and the anchor game object in the first linear direction;
      the anchor game object and the or a next one of the further anchor game objects;
      two of said further anchor game objects; and
      the further or a last of the further anchor game objects and the second game object.

4. The method according to claim 3, wherein the algorithm for determining the validity of the user input returns a valid indication to the at least one processor in dependence on the user input defining movement comprising at least one further anchor object.

5. The method according to claim 3, wherein the input comprises two further anchor game objects between the initially selected first game object and said second game object sharing the same first characteristic.

6. The method according to claim 1, wherein the user input is displayed to the user on said game board in dependence on the validity determination of said algorithm.

7. The method according to claim 1, wherein the game board arrangement and information comprises further game objects having further characteristics stored in said at least one memory.

8. The method according to claim 7, wherein the further game object characteristics comprise activation of said characteristics when said algorithm determines that at least one further game object is selected in said user input.

9. The method according to claim 8, wherein the characteristics of said further game objects when activated comprise removing game objects in at least one different direction to the respective linear direction of the user input activating said further object.

10. The method according to claim 9, wherein said activation of said further object comprises eliminating all game objects in a row or column of said game board in an orthogonal direction to said respective linear direction of the user input activating said further object.

11. The method according to claim 1, wherein said processor selects game objects to replace said removed game objects based on a current game board state.

12. The method according to claim 11, wherein the game board state comprises a count of one or more of: current game or further game objects, current game or further game object characteristics, available input sequences.

13. The method according to claim 12, wherein the count is compared against a threshold to determine whether to replace the removed game objects with the selected game objects or whether to make a new selection of game objects.

14. The method as claimed in claim 1, wherein said user interface provides said display.

15. A computer implemented method for controlling a user interface and displaying a game board arrangement on the user interface, the method comprising executing on at least one processor, in communication with said user interface and at least one memory, the steps of:
displaying on the user interface a game board arrangement having a plurality of game objects each having one or more characteristics, information on said game board arrangement and said game objects being stored in said at least one memory,
determining an initial selection of a first game object in dependence on user input received via said user interface and in dependence on the stored information on said game board arrangement,
determining an input sequence of movement with respect to said game board, said input sequence of movement being defined by user input via the user interface, said input sequence being defined by the initial selection of said first game object, movement in a first linear direction from the first game object to an anchor game object and then movement in a second different linear direction from the anchor game object to a second game object to thereby select said second game object, at least one other game object being between the first game object and the anchor game object in the first linear direction and at least one different other game object being between the anchor game object and the second game object in the second linear direction;
determining the validity of the input sequence, by: determining that said selection on said user interface began at said first game object having at least one characteristic, determining that said selection includes said anchor game object having at least one same characteristic, and determining that said selection ended on said second game object having at least one same characteristic;
updating said game board arrangement information for a valid user input such that all said first, second, anchor, at least one other, and at least one different other game objects are removed from the displayed game board, wherein at least one of said at least one other game object and at least one different other game object have a different characteristic to said game characteristic; and
selecting game objects to replace said removed game objects based on the current game board state.

16. The method according to claim 15, wherein the game state comprises a count of one of more of: current game or further game objects, current game or further game object characteristics, available input sequences.

17. The method according to claim 16, wherein the count is compared against a threshold to determine whether to replace the removed game objects with the selected game objects or whether to make a new selection of game objects.

18. The method as claimed in claim 15, wherein said at least one other game object and at least one different other game object have a same or different characteristic.

19. A computing device adapted to play a computer game, the computer device having:
a display configured to display a game board having a plurality of game objects;
a user interface configured to receive user input;
at least one memory storing each game object having one or more characteristics, and at least one processor, in connection or communication with at least one memory, configured to execute steps to:
display on the display a game board arrangement having a plurality of game objects each having one or more characteristics, information on said game board arrangement and said game objects being stored in said at least one memory,
determine an initial selection of a first game object in dependence on user input received via said user interface and in dependence on the stored information on said game board arrangement,
determine an input sequence of movement with respect to said game board, said input sequence of movement being defined by user input via the user interface, said input sequence begin defined by the initial selection of said first game object, movement in a first linear direction from the first game object to an anchor game object and then movement in a second different linear direction from the anchor game object to a second game object to thereby select said second game object, at least one other game object being between at least one of:
the first game object and the anchor game object in the first linear direction; and
the anchor game object and the second game object in the second linear direction;
execute an algorithm for determining a validity of the input sequence said algorithm comprising: determining that said selection on said user interface began at said first game object having at least one characteristic, determining that said selection includes said anchor game object having at least one same characteristic, and determining that said selection ended on said second game object having at least one same characteristic;
update of said game board arrangement information for a valid input sequence such that all said first, second, anchor, and at least one other game objects are removed from the displayed game board, wherein at least one of said at least one other game object have a different characteristic to said game characteristic; and
display said updated game board arrangement.

20. The computing device as claimed in claim 19, wherein the at least one processor is configured to execute steps to detect said user input defining movement in the first linear direction from the first game object to the anchor game object and then in a respective different linear direction to a respective further anchor game object, wherein there is one or more further anchor game objects with a change in linear direction being provided at the or each further anchor game object, said movement being from the further or a last of the further anchor game objects to said second game object,
the at least one other game object being between at least one of:
the first game object and the anchor game object in the first linear direction;
the anchor game object and the or a next one of the further anchor game objects;
two of said further anchor game objects; and
the further or a last of the further anchor game objects and the second game object.

21. A computer readable non-transitory storage medium carrying one or more sequences of instructions which when executed by at least one processor in communication with a user interface, a display and at least one memory, enables the at least one processor to:

cause display on the display, a game board arrangement having a plurality of game objects each having one or more characteristics, information on said game board arrangement and said game objects being stored in said at least one memory;

determine an initial selection of a first game object in dependence on user input received via said user interface and in dependence on the stored information on said game board arrangement;

determining an input sequence of movement with respect to said game board, said input sequence of movement being defined by user input via the user interface, said input sequence being defined by the initial selection of said first game object, movement in a first linear direction from the first game object to an anchor game object and then movement in a second different linear direction from the anchor game object to a second game object to thereby select said second game object, at least one other game object being between at least one of:

the first game object and the anchor game object in the first linear direction; and the anchor game object and the second game object in the second linear direction; execute an algorithm for determining a validity of the input sequence said algorithm comprising: determining that said selection on said user interface began at said first game object having at least one characteristic, determining that said selection includes said anchor game object having at least one same characteristic, and determining that said selection ended on said second game object having at least one same characteristic, update said game board arrangement information for a valid user input such that all said first, second, anchor, and at least one other game objects are removed from the displayed game board, wherein at least one of said at least one other game object have a different characteristic to said game characteristic, and display said updated game board arrangement.

* * * * *